SLOW-WAVE CIRCUIT INCLUDING MEANDER LINE AND SHIELDING THEREFOR

Filed Sept. 29, 1967 8 Sheets-Sheet 1

March 31, 1970 MASAKAZU FUKUSHIMA 3,504,222

SLOW-WAVE CIRCUIT INCLUDING MEANDER LINE AND SHIELDING THEREFOR

Filed Sept. 29, 1967 8 Sheets-Sheet 2

3,504,222
Patented Mar. 31, 1970

3,504,222

SLOW-WAVE CIRCUIT INCLUDING MEANDER LINE AND SHIELDING THEREFOR

Masakazu Fukushima, Hachioji-shi, Japan, assignor to Hitachi, Ltd., Tokyo-to, Japan Filed Sept. 29, 1967, Ser. No. 671,860
Claims priority, application Japan, Oct. 7, 1966, 41/65,627, 41/65,628
Int. Cl. H01j *29/70, 25/36;* H03h *7/30*
U.S. Cl. 315—3 15 Claims

ABSTRACT OF THE DISCLOSURE

A slow-wave circuit for microwave use including a meander line forming the slow-wave circuit shielded by a shield member having partition walls inserted into the respective pitch intervals of the line, whereby the dispersion characteristic of the circuit is improved.

This invention relates to a slow-wave circuit, ard more particularly to an improved slow-wave circuit for use in oscilloscope cathode ray tubes capable of displaying microwave signals, travelling-wave tubes, masers and the like.

As is well known, the conventional oscilloscope cathode ray tube includes vertical and horizontal deflection devices, each comprising a pair of deflection electrodes or plates so arranged as to produce a deflection field in a predetermined direction. In the case wherein the operative frequency of a deflection signal applied across the plates is relatively low, the transit time of electrons passing through the gap of the plates can be neglected, since it is possible to consider that such transit time is considerably small in comparison with the variation in the instant value of the deflectoñ signal. However, it becomes impossible to neglect such transit time when the operative frequency of the deflection signal increases remarkably. Accordingly, the observation of a signal becomes impossible with increase of the frequency of the deflection signal into the microwave region. For the purpose of elimination of this disadvantage, in other words, in order to proportion the magnitude of deflection to the instant value of the deflection signal, it is required to increase the velocity of the elecrons, or to shorten the length of the deflection plates along the electron beam path. According to these methods, however, it is impossible to avoid a consequent reduction in the deflection sensitivity and increased difficulty in the manufacture of the tubes.

For the purpose of eliminating these difficulties, it has been proposed to use for this type of display a tube referred to as a "travelling-wave-type oscilloscope tube," wherein the electric field between the deflection plates is caused to travel along the beam path together with the electrons from the electron gun toward the target. This type of tube used for a relatively low frequency range (for example, 100 to 300 megacycles) is usually provided with two pairs of deflection plates, each of which comprises electrodes consisting of a plurality of divided plates which are electrically driven by an outside or inside circuit and comprise a delay circuit of the lumped constant type. In the meantime, for a relatively high frequency range, (for example, more than 1,000 megacycles) the tube is provided with deflection devices comprising slow-wave circuits, such as helixes or meander lines.

However, since the conventional slow-wave circuit composed of a meander line tends to exhibit an objectionable dispersion characteristic at the high operating frequency range thereof, the deflection device using such slow-wave circuits has the disadvantage that it is difficult to synchronize the travelling electric field with the electrons from the electron gun throughout the entire operating frequency range of the tube. Moreover, since it is impossible to form any plane electrode from such a slow-wave circuit, a uniform deflection field cannot be produced by such circuit. Consequently, the pattern represented on the observing surface of the tube by the electron beam deflected by such slow-wave circuits, tends to include some objectionable distortion.

Accordingly, it is a general object of the present invention to eliminate such disadvantages as mentioned above.

A specific object of the present invention is to provide a slow-wave circuit having an improved dispersion characteristic by reducing the effective line capacity thereof.

Another object of the present invention is to provide an improved slow-wave circuit, according to which it is possible to form a desirable uniform electric field.

A further object of the present invention is to provide an improved slow-wave circuit adaptable to travelling-wave tubes, masers and the like, and to the other general purposes.

These and additional objects and advantages of the present invention will become apparent from the following description beginning a brief explanation of the conventional slow-wave circuit when taken in connection with the accompanying drawing wherein:

FIGURE 1 is a side view of one of the conventional oscilloscope tubes;

FIGURES 2*a* and 2*b* show one example of conventional deflection devices used in the tube of FIGURE 1, in which FIGURE 2*a* is a sectional view including schematic circuit connections and FIGURE 2*b*, a plane view thereof, respectively;

Figure 4:
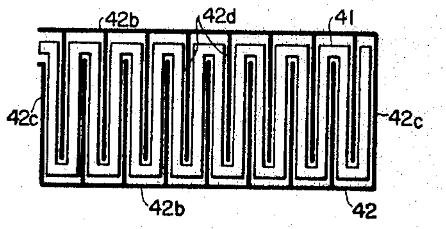
FIGURES 4 and 5 are plane and perspective views, respectively, of one embodiment of the present invention.
Figure 5:
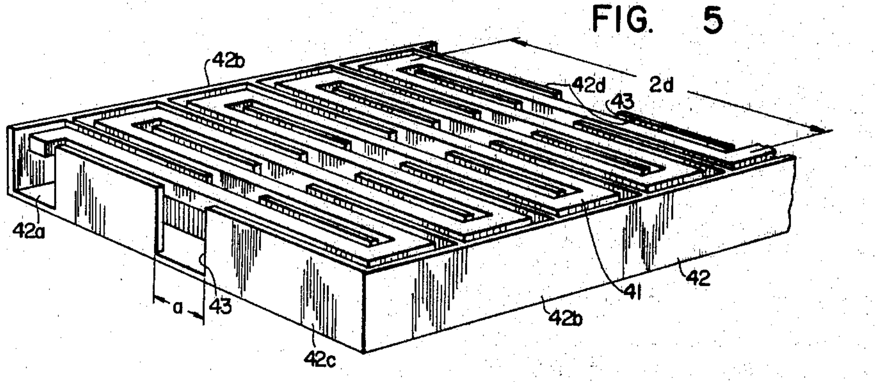
Figure 7:
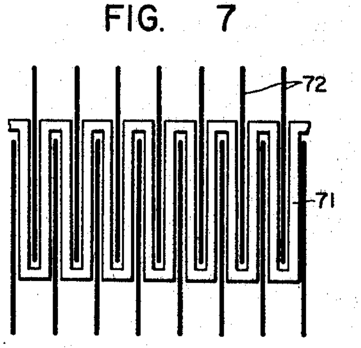
FIGURE 7 is a plane view showing, in general, another embodiment of the present invention.
Figure 8A:
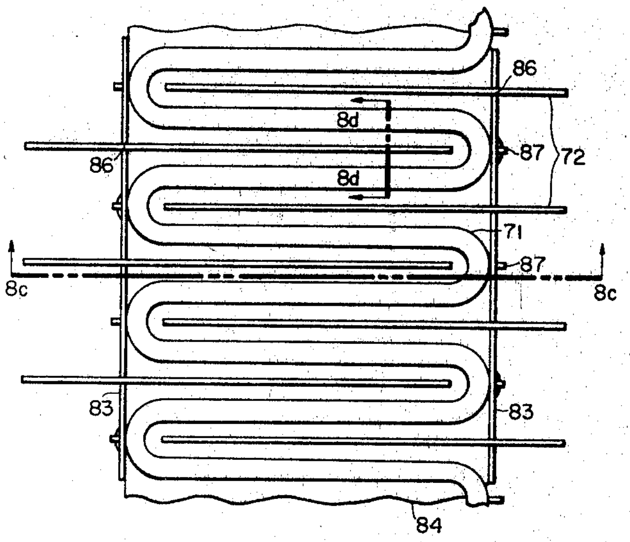
Figure 8B:
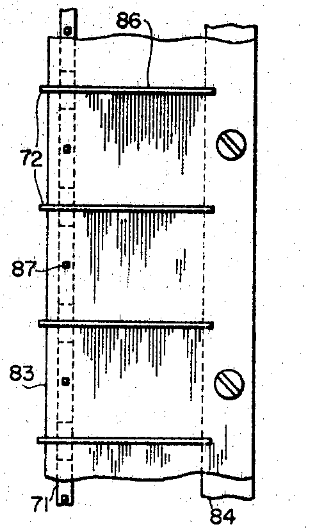
Figure 8C:
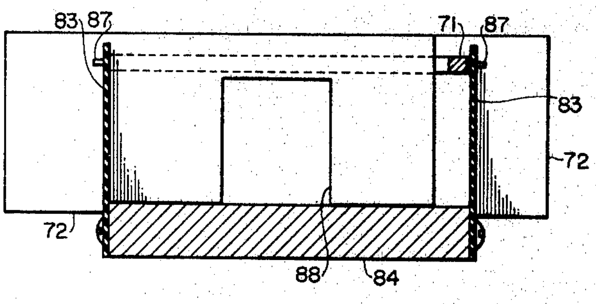
Figure 8D:
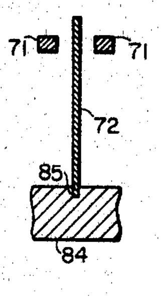
Figure 9:
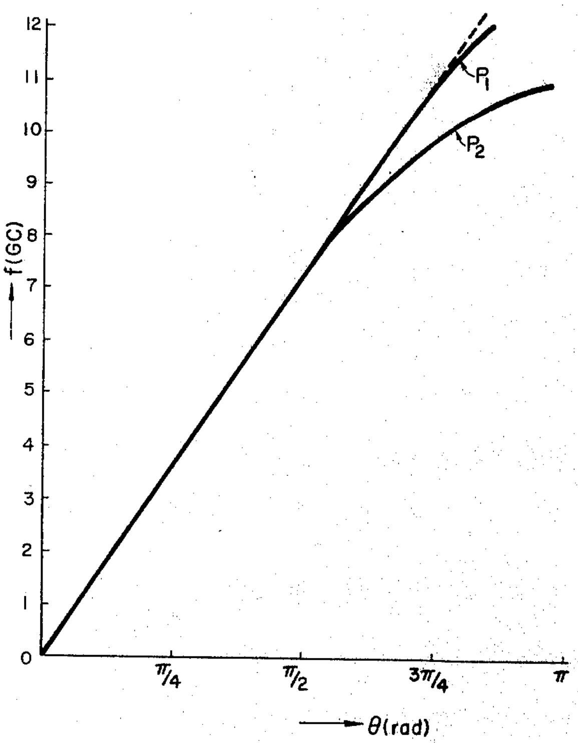
Figure 10A:
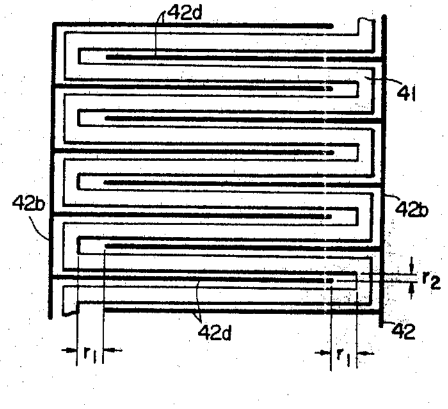
Figure 10B:
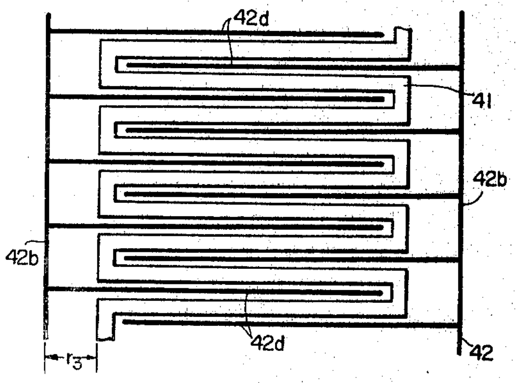
Figure 10C:
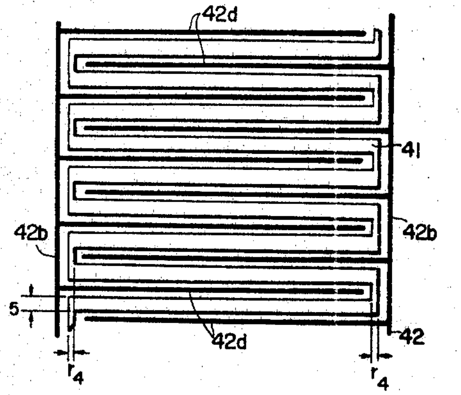
Figure 11A:
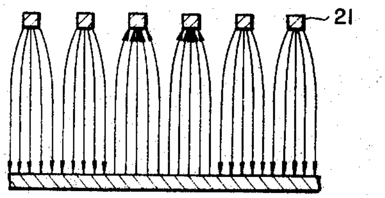
Figure 11B:
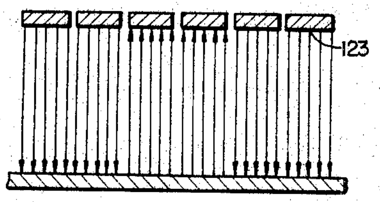
Figure 12A:
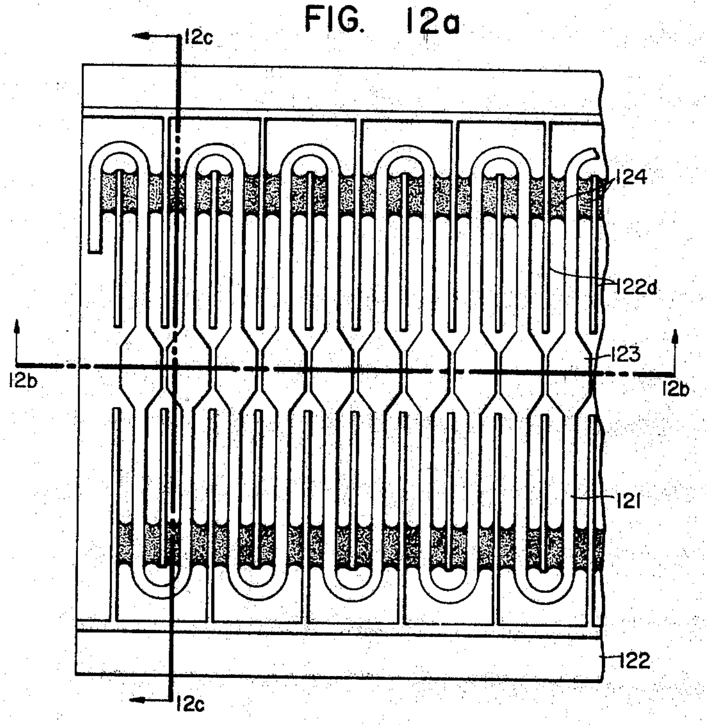
Figure 12B:
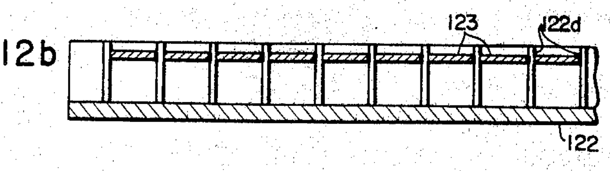
Figure 12C:
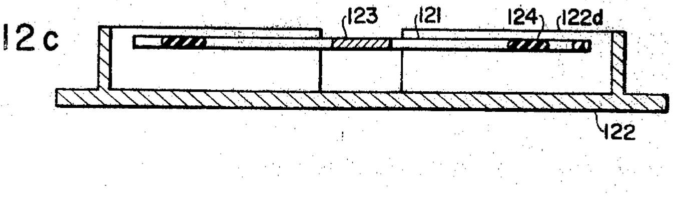
Figure 13:
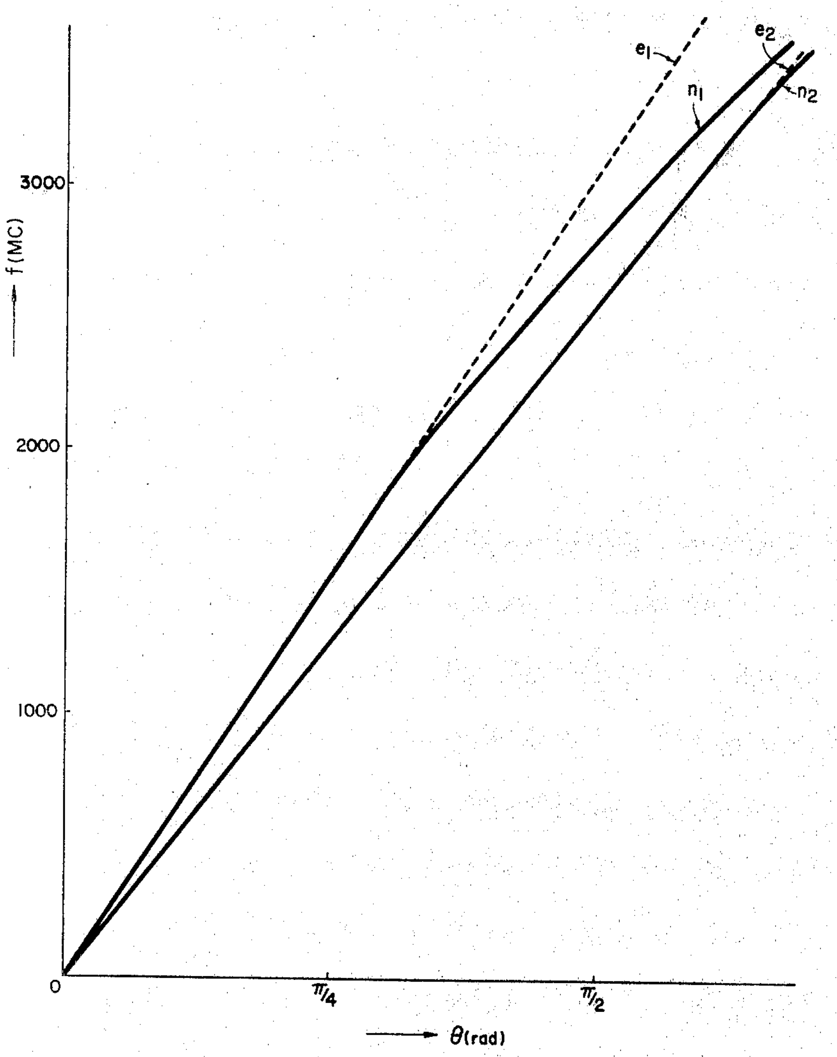
Figure 14A:
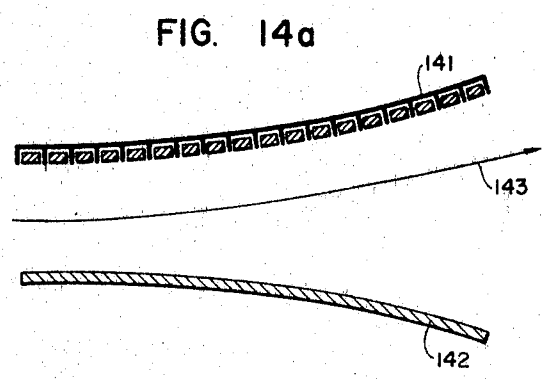
Figure 14B:
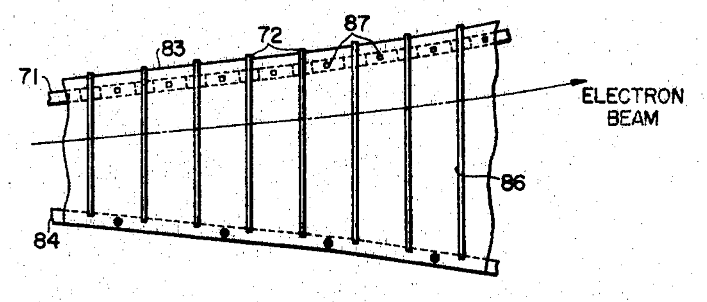

FIGURES 8*a* through 8*d* show the detail of the embodiment of FIGURE 7, in which FIGURE 8*a* is a plane view, FIGURE 8*b*, a side view, FIGURE 8*c*, a sectional view along the line 8*c* in FIGURE 8*a*, and FIGURE 8*d*, a sectional view along the line 8*d* in FIGURE 8*a*, respectively;

FIGURE 9 is a characteristic diagram showing the dispersion characteristic of the embodiment of FIGURE 8;

FIGURES 10*a*, 10*b* and 10*c* are plane views showing modifications of the embodiment of FIGURES 4 and 5;

FIGURES 11*a* and 11*b* are sectional side views for illustrating the distribution of different electric fields produced by two kinds of the slow-wave circuits;

FIGURES 12*a* through 12*c* show still another embodiment of the present invention, in which FIGURE 12*a* is a plane view, FIGURE 12*b*, a sectional view along the line 12*b* in FIGURE 12*a*, and FIGURE 12*c*, a sectional view along the line 12*c* in FIGURE 12*a*, respectively;

FIGURE 13 is a characteristic diagram showing the dispersion characteristic of the embodiment of FIGURE 12; and FIGURE 14 is sectional views showing two different examples of deflection devices for an oscilloscope tube, in which the slow-wave circuit of the present invention is used.

Figure 1:
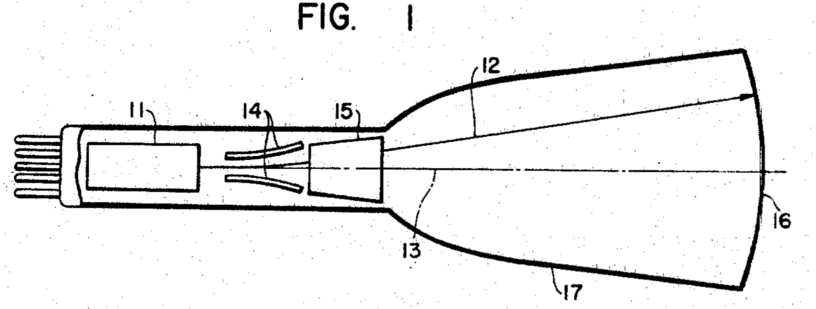

Referring now to FIGURE 1, which illustrates the general construction of one conventional oscilloscope tube for microwave use, an electron gun 11 generates an electron beam 12 which is emitted from the gun in the direction of the optical axis 13 of the tube. A vertical deflection device 14 is provided for deflecting the electron beam 12 in the vertical direction, and a horizontal deflection device 15 is provided for deflecting the electron beam 12 in the horizontal direction so as to scan the face plate 16 of the tube. These elements are mounted in the conventional manner in an evacuated envelope 17 of the tube. The functions of the oscilloscope tube shown in this figure is emitted from the description herein, because it is the same in principle as that of the conventional cathode ray tube.

Figure 2A:
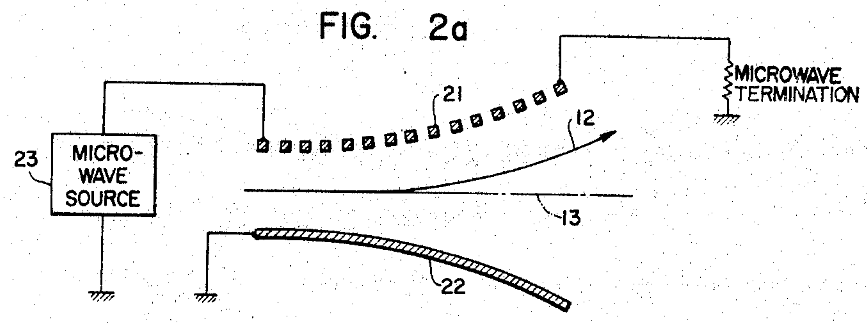
Figure 2B:
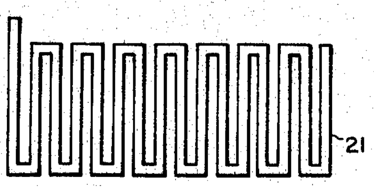

FIGURE 2*a* illustrates an enlarged sectional view of the deflection device comprising a slow-wave circuit 21 consisting of a meander line of conductive material, and an oppositely disposed ground or sole electrode 22, which corresponds to the vertical or horizontal deflection device 14 or 15 in FIGURE 1, and FIGURE 2*b* illustrates a plane view of the slow-wave circuit 21 in FIGURE 2*a*.

The electrode 22 is grounded, and the slow-wave circuit is connected to a micro-wave source 23, as shown in FIGURE 2*a*. Consequently, an electrical deflection field is produced between the slow-wave circuit 21 and the ground electrode 22 by a microwave signal supplied from the source 23 to the slow-wave circuit 21. In the case wherein the phase velocity of the electric field travelling along the optical axis 13 coincides or synchronizes with the velocity of electrons passing through the deflection field, the electron beam 12 is deflected in proportion to the strength of the electric field.

In the above-described deflection device, the phase velocity of the electric field tends to reduce with increase of the operating frequency, so that the synchronization between the phase velocity and the velocity of the electrons cannot be maintained at a high operating frequency.

Accordingly, it becomes impossible to observe signals having a frequency higher than a certain limit value on the oscilloscope tube including the known deflection devices using such a slow-wave circuit.

Figure 3:
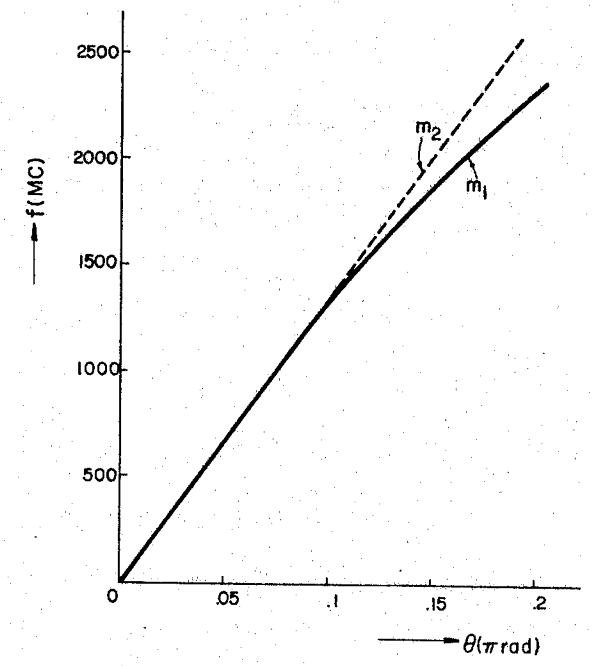
FIGURE 3 shows a dipersion characteristic of the conventional slow-wave circuit used in the device of FIGURE 2.

FIGURE 3 is a diagram illustrating dispersion characteristics for one example of a conventional meander line. The horizontal axis indicates the phase angle $\theta$ of the deflection field, and the vertical axis indicates the frequency $f$ of the deflection signal, the above phase angle $\theta$ being given by a value represented by a product of the phase constant $\beta$ by the pitch $p$ of the meander line. The curve $m_1$ indicates the dispersion characteristic of the conventional meander line, and $m_2$ represents the optimum dispersion characteristic. So long as the dispersion characteristic of the meander line varies as the optimum curve $m_2$, and the inclination thereof which indicates the velocity of the microwave energy on the meander line coincides with the electron velocity, both velocities remain synchronized with each other. In practice, however, the actual dispersion characteristic $m_1$ in FIGURE 3 tends to gradually separate from the optimum curve $m_2$ with increase of the operating frequency. As is apparent from the figure, the upper limit of the operable frequency range wherein the phase velocity synchronizes with the electron velocity is about 1,500 megacycles at most. Consequently, it is impossible to observe microwave signals having a frequency higher than about 1,500 megacycles by the oscilloscope tube using the above-mentioned conventional slow-wave circuits.

According to experiment, it is noted that the dispersion characteristic of the slow-wave circuit is largely influenced by the coupling condition between adjoining portions on the circuit. In other words, the above-mentioned objectionable characteristic of known arrangements originates not only from an inductive coupling condition between the adjoining line elements of the circuit, but also by a capacitive coupling condition therebetween.

FIGURE 4 illustrates, in principle, one embodiment of the present invention, and FIGURE 5 illustrates the details thereof. As shown in both figures, the meander line 41 is provided with a metallic shield member 42 consisting, for example, of copper or aluminum alloy plate. This shield member 42 comprises a bottom plate portion 42*a*, two side wall portions 42*b*, two end wall portions 42*c*, and a plurality of partition wall portions 42*d* inserted into the respective pitch intervals of the line. Both elements, i.e. the meander line 41 and the shield member 42, are mechanically connected to each other by suitable adhesives consisting of an insulating material, for example, epoxy resin, or by other suitable means. However, a specific illustration of the connecting means has been omitted in the figures for simplification of the drawing. The shield member 42 is maintained at ground potential, and the microwave signal is applied between the meander line 41 and the opposed ground electrode (not shown) arranged above the slow-wave circuit, so as to produce the deflection field.

Figure 6:
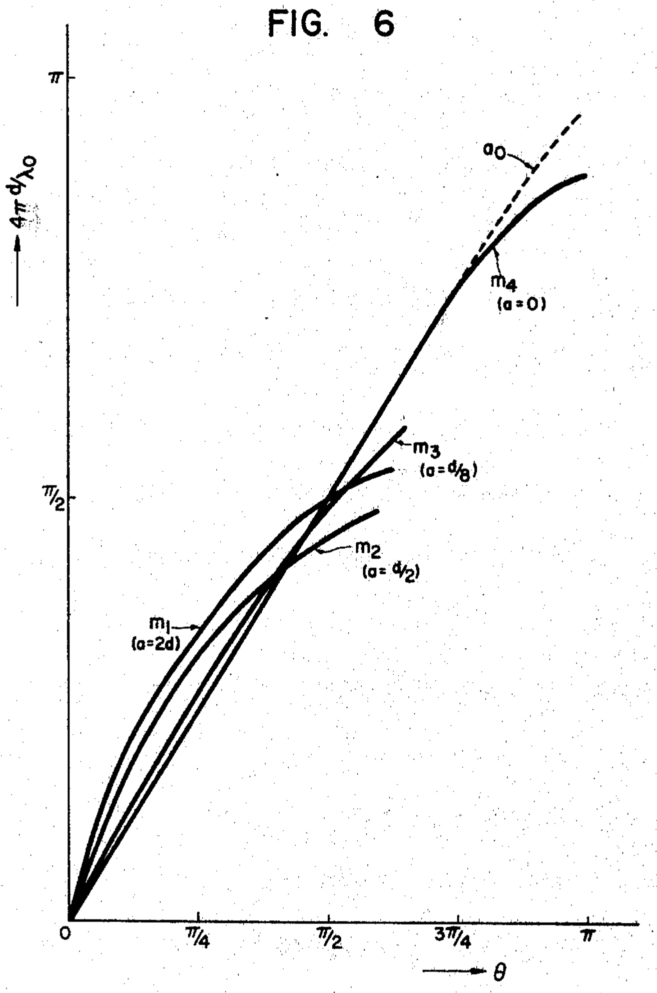
FIGURE 6 is a characteristic diagram illustrating the functions of the embodiment of FIGURES 4 and 5.

Each of the partition walls 42*d* and end walls 42*c* is provided with an opening or space portion 43 at a position facing the path of electrons to be subjected to the action of the line 41. If it is assumed that the width of these space portions 43 is represented by a reference $a$, and the effective width of the meander line 41 in the direction transverse to the electron path is represented by $2d$, the dispersion characteristics of the slow-wave circuits with various dimensions of $a$ can be obtained experimentally, as shown in FIGURE 6. In this figure, the horizontal axis indicates the phase angle $\theta$, the meaning of which is the same as $\theta$ in FIGURE 3, and the vertical axis indicates a variable expressed by an equation $4\pi d/\lambda_0$, where $\lambda_0$ is the free space wave-length of the microwave. The curves $m_1$, $m_2$, $m_3$, and $m_4$, indicate the different dispersion characteristics in the cases where four kinds of values of $a$, namely, $2d$, $\frac{1}{2}d$, $\frac{1}{8}d$, and zero are selected for the slow-wave circuit.

The curve $m_1$ indicates the dispersion characteristic in the case where the width $a$ of the space portions 43 is selected at the same value as the effective width $2d$ of the meander line. On the other hand, the curve $m_4$ indicates the dispersion characteristic in case of the shield member having no space portion. It will be apparent from the figure that the dispersion characteristic of the slow-wave circuit tends to approach a straight line (i.e. the optimum characteristic) by inserting the shield material into the pitch intervals of the line. This means that the shield member 42 is very effective to maintain the phase velocity of the microwave on the slow-wave circuit at a constant value throughout a broad frequency range.

According to the embodiment of FIGURES 4 and 5, it is still impossible to cause the dispersion characteristic to coincide with the optimum curve completely. From experiments, it has been found that the capacitance at the folded portions of the line tends to increase by reason of turbulence in the electromagnetic field originating due to the existence of the shield member, and thereby the observable frequency range is limited.

This disadvantage is eliminated in an embodiment of the invention illustrated in FIGURES 7 and 8. FIGURE 7 illustrates this embodiment in principle, in which a meander line 71 is provided with a plurality of partition plates or walls 72 inserted into the respective pitch intervals of the line. The respective partition plates project from both sides of the meander line 71 by a predetermined distance, and the side walls 42*b* in FIGURES 4 and 5 are removed in this case. The similar structure can be also obtained by using the shield member of FIGURE 5 which is provided with the side walls 42*b* having suitable openings at the positions corresponding to the folded portions of the line. By using this shield member, the effective capacitance formed between the shield member and the folded points of the line is caused to effectively reduce to compensate for the capacitive reactance originating from the turbulence of the electromagnetic field, and it is possible to obtain a slow-wave circuit having an improved characteristic throughout a considerably broad frequency range. The dispersion characteristic of the slow-wave circuit in this case is shown in FIGURE 6 by means of a dotted line $a_0$.

FIGURES 8$a$ through 8$d$ illustrate the detailed structure of the embodiment of FIGURE 7. Two insulating plates 83 consisting, for example, of mica plates, are fixed to both side surfaces of a metallic base plate 84 at the bottom portion thereof. The base plate 84 is provided with a plurality of grooves 85 (see FIGURE 8$d$) prepared corresponding to the pitch of the meander line 71 for receiving the shield plate 72 and the insulating plates 83 are provided with a plurality of slots 86 (see FIGURES 8$a$ and 8$b$) alternatively prepared with an interval which is twice the pitch of the line 71. The respective partition plates 72 are inserted into the slots 86 of the insulating plates 83 and the grooves 85 of the base plate 84, so that the substantial portion of each partition plate 72 is positioned within each pitch interval of the meander line 71 and the remaining free end thereof is projected outside of the insulating plate 83. If necessary, both sides of the respective partition plates 72 are tightly connected with the insulating plates 83 by suitable adhesives, such as epoxy resin, and the bottom thereof is soldered to the base plate 84. The meander line 71 is fixed with the insulating plates 83 at the respective folded points thereof by metallic pins 87.

FIGURE 9 illustrates the dispersion characteristic of the embodiment of FIGURE 8. The curve $P_1$ is the dispersion characteristic of this embodiment, and the curve $P_2$ is the characteristic obtained by a slow-wave circuit wherein the folded portions of the line are completely shilelded, as shown in FIGURES 4 and 5. The dotted line in FIGURE 9 is the optimum curve. It will be apparent from the figure that the upper limit of the operative frequency can be improved up to about 10 gigacycles.

FIGURES 10$a$ through 10$c$ illustrate three different modifications of the embodiment of FIGURE 4, wherein the same reference numerals are used to designate similar elements as in FIGURE 4. In the embodiment shown in FIGURE 10$a$, the distance $r_1$ between the inside surface of each folded portion of the meander line 41 and the end portion of each of the partition walls 42$d$ of the shield member 42 is selected at a certain value larger than the distance $r_2$ between the straight portions of the line 41 and the partition walls 42$d$, whereby the capacitance at the folded points can be reduced. In the embodiment shown in FIGURE 10$b$, the distance $r_3$ between the outside surface of the folded portions and the side wall 42$b$ of the shield member 42 is selected at a relatively larger value than the distances at the other portions so as to obtain a substantially equal function to the embodiment of FIGURES 7 and 8. Moreover, in the embodiment of FIGURE 10$c$, the width $r_4$ of the folded portions of the line 41 is selected smaller than the width $r_5$ of the straight portions thereof. According to this embodiment, since the sectional area of the folded portions is smaller than the other portions, the capacitive reactance at the folded portions can be effectively compensated by the increased inductive reactance component originating from the smaller area of the folded portions.

As mentioned above, it is possible to remarkably improve the dispersion characteristics of the slow-wave circuit according to the present invention. However, as shown in FIGURE 11$a$, the electric field formed between the slow-wave circuit 21 and the opposite electrode 22 is not uniform, since the slow-wave circuit does not have any continuous operable plane along the electron path. For this reason, the pattern image obtained by the deflection devices using such a slow-wave circuit tends to deform objectionably.

This disadvantage can be avoided in the embodiment of the invention shown in FIGURE 12, including a meander line 121 and a shield member 122. Though the principal structure of this embodiment is similar to the above-mentioned embodiments, it differs from those embodiments in that partition walls 122$d$ are removed partially at the positions facing the electron path, and the meander line 121 is provided with a plurality of expanded width portions 123 which are arranged along the electron path so as to form a substantially continuous electrode structure. According to this structure, as shown in FIGURE 11$b$, it is possible to render more uniform the produced electric field. Besides, FIGURE 12$a$ shows the use of suitable adhesives 124 for connecting the meander line 121 with the shield member 122$d$.

FIGURE 13 illustrates the dispersion characteristic of the embodiment of FIGURE 12, in which the curve $n_1$ shows the characteristic of the slow-wave circuit not having expanded plates 123, and the curve $n_2$ shows the dispersion characteristic of the present embodiment. The curve $e_1$ shows the optimum characteristic in the former case, and the curve $e_2$ is the optimum characteristic for the latter case. As is apparent from the figure, though the maximum operative frequency in the former case is 2,000 megacycles at most, the same in the case of the embodiment of FIGURE 12$a$ is 3,500 megacycles.

FIGURE 14$a$ illustrates one example of the deflection device using the slow-wave circuit of the present invention. As shown in the figure, it is desirable that the slow-wave circuit 141 and the opposing ground electrode are curved out along the electron beam path so as to prevent the electron beam 143 from reaching the circuit 141 or electrode 142. In the case wherein the shield member comprises the partition walls and end walls having the central space portion (which is shown by the numerals 43 in FIGURE 5 and 88 in FIGURE 8$c$), a passage formed by such space portions can be used for the electron beam path. In this case the microwave field for deflection is produced between the meander line and the base plate 84. FIGURE 14$b$ illustrates the latter example wherein the references attached at various parts indicate elements similarly designated in FIGURE 8.

While there are shown and described only few embodiments of the present invention, it will be understood that this application is not limited thereto but is susceptible of numerous changes and modifications as known to a person skilled in the art, and, I therefore do not wish to be limited to the details shown and described herein but intend to cover such modifications and changes as are within the scope of the appended claims.

I claim:

1. A slow-wave circuit comprising:

a meander line of conductive material along which a microwave travels, said meander line being formed as a zig-zag line in meander fashion by conductive strip portions arranged in parallel to one another, and conductive folded portions connecting mutually adjacent strip portions together at one end thereof, respectively, whereby pitch interval spaces are provided between the respective strip portions; and shield means of conductive material operatively associated with said meander line and including partition walls inserted into the pitch interval spaces of the meander line at least at the position between ends of the mutually adjacent strip portions as well as between mutually adjacent folded portions for effectively reducing electric couplings between the strip portions at the end parts thereof.

2. A slow-wave circuit according to claim 1, where the cross-sectional area of said line at the folded portions thereof is smaller than the strip portions thereof, whereby the capacitive reactance at the folded portions can be compensated.

3. A slow-wave circuit according to claim 1, wherein the width of portions of adjacent strips of said meander line extending linearly across said meander line are enlarged, whereby a microwave field produced by said line is extremely uniform.

4. A slow-wave circuit according to claim 1, wherein said shield member further comprises side walls connected together, each connecting partition wall in every second pitch interval space with each other, respectively, so that the respective folded portions of said meander line are surrounded by said side walls together with said partition walls.

5. A slow-wave circuit according to claim 4, wherein said side walls are positioned to be spaced from the folded portions of said line with a relatively large distance in comparison with the distance between said partition walls and said strip portions, whereby the capacitance between the partition walls and the folded portions is reduced.

6. A slow-wave circuit comprising:
- a conductive meander line on which a microwave travels; and
- a conductive shield member operatively associated with said meander line and having a plurality of partition walls, each inserted, at least partially, into the respective pitch intervals of said meander line;
- the end portion of said respective partition walls facing the respective folded portions being spaced from the inside of said folded portions by a relatively large distance in comparison with the distance between the surface of said partition walls and said line, whereby the capacitance at the folded portions can be reduced.

7. A slow-wave circuit comprising:
- a metallic meander line on which a microwave travels; a metallic shield member operatively associated with said meander line at least between the respective pitches of said line; and means for reducing the effective capacitance at the folded portions of said line; said shield member including a plurality of members positioned between the respective pitches of the line, said means for reducing the effective capacitance at the folded portions of the line including extension portions of said shield members projecting outwardly beyond the bounds of said line by a significant distance on either side thereof.

8. A slow-wave circuit according to claim 7 wherein said means for reducing the capacitance at the folded portions of the line further includes insulating side walls positioned along two opposing sides of said in proximity thereto and extending transversely to said shield members, the extension portions of said shield members extending through said side walls.

9. An electrostatic deflection system for deflecting a charged particle comprising
- a conductive meander line being formed as a zig-zag line in meander fashion by a plurality of parallel linear portions connected by folded portions to form a plurality of interdigitated pitch interval spaces, and

- a conductive plate member positioned in spaced, substantially superposed relationship,
- a source of microwave energy connected to one end of said meander line, and
- a conductive shield member operatively associated with said meander line and having a plurality of partition walls, each inserted into the respective pitch intervals of said meander line and extending along the linear portions so as to be interposed therebetween said folded portions.

10. The combination defined in claim 8 wherein said hield member further includes side walls connecting with said partition walls and surrounding the respective folded portions of said line.

11. The combination defined in claim 10 wherein said side walls are made of insulating material and said partition walls extend through said side walls and beyond by a significant distance.

12. The combination defined in claim 10 wherein said side walls are positioned to be spaced from the folded portions of said line by a relatively large distance in comparison to the distance between said partition walls and said line.

13. The combination defined in claim 9 wherein the end portion of said respective partition walls facing the respective folded portions is spaced therefrom by a relatively large distance in comparison with the distance between the surface of said partition walls and said line.

14. The combination defined in claim 9 wherein the cross-sectional area of the folded portions of said line is smaller than the cross-sectional area of the other portions thereof.

15. The combination defined in claim 9 wherein the cross-sectional area of sections of the linear portions of said line forming a path across said line transverse thereto is larger than the cross-sectional area of the other portions of said line.

References Cited

UNITED STATES PATENTS

| | | | |
|---|---|---|---|
| 2,653,270 | 9/1953 | Kompfner | 315—3.5 |
| 2,827,589 | 3/1958 | Hines | 315—3.5 |
| 2,922,074 | 1/1960 | Moulton | 315—3.5 X |
| 3,118,110 | 1/1964 | Spangenberg | 315—7 X |
| 3,231,780 | 1/1966 | Feinstein. | |
| 3,237,046 | 2/1966 | Olson | 315—3.5 |
| 3,358,179 | 12/1967 | Farney | 315—3.5 |

HERMAN KARL SAALBACH, Primary Examiner

SAXFIELD CHATMON, Jr., Assistant Examiner

U.S. Cl. X.R.

315—3.5; 333—7, 18, 31